US012598545B2

(12) United States Patent
Dong

(10) Patent No.:　US 12,598,545 B2
(45) Date of Patent:　　Apr. 7, 2026

(54) COMMUNICATION METHOD AND COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 354 days.

(21) Appl. No.: 18/271,440

(22) PCT Filed: Jan. 8, 2021

(86) PCT No.: PCT/CN2021/070950
§ 371 (c)(1),
(2) Date: Jul. 7, 2023

(87) PCT Pub. No.: WO2022/147788
PCT Pub. Date: Jul. 14, 2022

(65) Prior Publication Data
US 2024/0064621 A1　　Feb. 22, 2024

(51) Int. Cl.
*H04W 48/16*　　(2009.01)
*H04W 48/12*　　(2009.01)
*H04W 76/15*　　(2018.01)

(52) U.S. Cl.
CPC ........... *H04W 48/16* (2013.01); *H04W 48/12* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 9,232,548 B2 | 1/2016 | Wang et al. | |
| 9,544,928 B2 | 1/2017 | Dong | |
| 9,888,503 B2 | 2/2018 | Wang et al. | |
| 10,499,440 B2 | 12/2019 | Mestanov et al. | |
| 10,616,933 B2 | 4/2020 | Wang et al. | |
| 2013/0230035 A1* | 9/2013 | Grandhi | H04W 48/20 370/338 |
| 2014/0010223 A1 | 1/2014 | Wang et al. | |
| 2014/0362842 A1 | 12/2014 | Dong | |
| 2015/0163723 A1* | 6/2015 | Pandey | H04W 48/16 370/254 |

(Continued)

FOREIGN PATENT DOCUMENTS

| | | |
|---|---|---|
| CN | 103765976 A | 4/2014 |
| CN | 107211273 A | 9/2017 |

(Continued)

OTHER PUBLICATIONS

The extended European search report of application No. 21916843.2 dated on Feb. 12, 2024.(13P).

(Continued)

*Primary Examiner* — Hong S Cho
(74) *Attorney, Agent, or Firm* — Arch & Lake LLP

(57) ABSTRACT

Provided are a communication method and a communication device. The communication method may include: determining a first message frame, wherein the first message frame includes information for instructing a station device to request a fast initial link setup (FILS) IP address configuration; and sending the first message frame.

18 Claims, 3 Drawing Sheets

(56) References Cited

U.S. PATENT DOCUMENTS

| | | | |
|---|---|---|---|
| 2015/0319559 A1 | 11/2015 | Lee et al. | |
| 2016/0157279 A1 | 6/2016 | Wang et al. | |
| 2016/0374118 A1 | 12/2016 | Mestanov et al. | |
| 2018/0132295 A1 | 5/2018 | Wang et al. | |
| 2018/0139119 A1* | 5/2018 | Soomro | G06F 21/79 |
| 2020/0045755 A1 | 2/2020 | Mestanov et al. | |

FOREIGN PATENT DOCUMENTS

| | | | | |
|---|---|---|---|---|
| CN | 108811041 A | 11/2018 | | |
| WO | WO-2015148805 A1 * | 10/2015 | | H04W 72/20 |

OTHER PUBLICATIONS

Motorola Mobility et al., "Conclusions about Trusted Non-3GPP Access", SA WG2 Meeting #129bis S2-1812598 Nov. 26-30, 2018, West Palm Beach, USA (revision of S2-1811838, 2509), Agenda Item: 6.7, Work Item / Release: FS_5WWC / Rel-16.(17P).

Duncan Ho et al., "MLA MAC Address Security", XP068172837, Doc:IEEE 802.11-200727r0; Jan. 2020.(12P).

Laurent Cariou,"MLO discovery Discovery procedures (inclusion probing) and RNR-XP068173919", Doc: IEEE 802.11-201651r1, Nov. 2020.(6P).

International Search Report of PCT/CN2021/070950 dated Sep. 27, 2021 with English translation, (6p).

Nokia Networks, "Security and authentication in LWA" 3GPP TSG-RAN WG2 Meeting #91bis, R2-154252, Oct. 9, 2015, (3p).

3rd Generation Partnership Project; Technical Specification Group Services and System Aspects, "Study on the Wireless and Wireline Convergence for the 5G system architecture", (Release 16), 3GPP TR 23.716 V0.6.0, Jul. 18, 2018, (109p).

First Office Action of Indian Application No. 202327052272 dated May 5, 2025, (7p).

Method and Apparatus for Setting Up Initial Link in a Wireless Communication System dated Feb. 21, 2013, English Abstract only (1p).

* cited by examiner

AP MLD                         non-AP STA MLD

AP1 ◄──── Link 1 ────► STA1

AP2 ◄──── Link 2 ────► STA2

AP3 ◄──── Link 3 ────► STA3

Determine a first message frame          210

Send the first message frame          220

COMMUNICATION METHOD AND COMMUNICATION DEVICE

CROSS-REFERENCE OF RELATED APPLICATION

The present application is a U.S. National Stage of International Application No. PCT/CN2021/070950, filed on Jan. 8, 2021, the disclosure of which is incorporated herein by reference in its entirety for all purposes.

BACKGROUND

A research scope of current Wi-Fi technologies is: bandwidth transmission of 320 MHz, aggregation and cooperation of a plurality of frequency bands, etc. with the expectation that the rate and throughput can be increased by at least four times compared with existing standards, whose main application scenarios are video transmission, Augmented Reality (AR), Virtual Reality (VR), etc.

The aggregation and cooperation of the plurality of frequency bands means that devices communicate with each other in frequency bands of 2.4 GHz, 5 GHz and 6 GHz simultaneously. For the simultaneous communications between the devices in the plurality of frequency bands, a new Media access Control (MAC) mechanism needs to be defined for management. In addition, it is also expected that the aggregation and cooperation of the plurality of frequency bands can support a low-latency transmission.

At present, aggregation and cooperation technologies of the plurality of frequency bands will support a maximum bandwidth of 320 MHz (160 MHz+160 MHz), and may also support 240 MHz (160 MHz+80 MHz) and other bandwidths.

In current technologies, stations (STAs) and Access Points (APs) can be Multi-Link Devices (MLDs), that is, the STAs and the APs support a function of simultaneous transmission and/or reception under a plurality of links at the same point of time. Therefore, in the current technologies, there can be the plurality of links between the STAs and the APs, and communications between these two devices under the plurality of links are being researched. When a STA accesses a network, it will receive an Internet Protocol (IP) address assigned under each link.

SUMMARY

The present disclosure relates to the field of communications, and in particular to cellular communication methods and devices. Various examples of the present disclosure provide the following technical solutions.

There is provided a communication method according to examples of the present disclosure. The communication method may be applied to a station device supporting a multi-link communication, and includes: determining a first message frame, wherein the first message frame includes information for indicating the station device to request a Fast Initial Link Setup (FILS) IP address configuration; and sending the first message frame.

There is provided a communication method according to examples of the present disclosure. The communication method may be applied to an access point device supporting a multi-link communication, and includes: receiving a first message frame, wherein the first message frame includes information for indicating a station device supporting the multi-link communication to request a Fast Initial Link Setup (FILS) IP address configuration; and assigning an IP address to the station device based on the first message frame.

There is provided a communication device according to examples of the present disclosure. The communication device may be applied to a station device supporting a multi-link communication, and includes: a processing module, configured to determine a first message frame, wherein the first message frame includes information for indicating the station device to request a Fast Initial Link Setup (FILS) IP address configuration; and a communication module, configured to send the first message frame.

There is provided a communication device according to examples of the present disclosure. The communication device may be applied to an access point device supporting a multi-link communication, and includes: a communication module, configured to receive a first message frame, wherein the first message frame includes information for indicating a station device to request a Fast Initial Link Setup (FILS) IP address configuration; and a processing module, configured to assign an IP address to the station device based on the first message frame.

There is provided an electronic device according to examples of the present disclosure. The electronic device includes a memory, a processor and a computer program stored on the memory and executable on the processor. The processor implements the method as described above when executing the computer program.

There is provided a computer-readable storage medium having a computer program stored thereon according to examples of the present disclosure. The computer program, when executed by a processor, implements the method as described above.

BRIEF DESCRIPTION OF THE DRAWINGS

The above and other features of examples of the present disclosure will be more apparent by describing the examples of the present disclosure in detail with reference to the accompanying drawings, in which.

DETAILED DESCRIPTION

The following description with reference to the accompanying drawings is provided to assist in a comprehensive understanding of various examples of the present disclosure as defined by the appended claims and their equivalents. The various examples of the present disclosure include various specific details, which are to be regarded as merely illustrative. In addition, the description of well-known technologies, functions and constructions may be omitted for clarity and conciseness.

The terms and words used in the present disclosure are not limited to written meanings, but are merely used by the inventor to enable a clear and consistent understanding of the present disclosure. Accordingly, for those skilled in the art, the descriptions of the various examples of the present disclosure are provided only for purposes of illustration and not of limitation.

It should be understood that singular forms "a", "an", "said" and "the" as used herein can also include plural forms unless the context clearly indicates otherwise. It should be further understood that the expression "including" or "comprising" as used in the present disclosure refers to the presence of the described features, integers, steps, operations, elements and/or components, but does not preclude the presence or addition of one or more other features, integers, steps, operations, elements, components and/or a combination thereof.

It should be understood that, although the terms "first", "second", etc. herein may be used to describe various elements, the elements shall not be limited by the terms. The terms are only used to distinguish one element from another. Thus, a first element discussed below may be referred to as a second element without departing from the teachings of examples.

It should be understood that when an element is referred to as being "connected" or "coupled" to another element, it can be directly connected or coupled to the other element or an intervening element may also be present. Furthermore, "connected" or "coupled" as used herein may include wirelessly connected or wirelessly coupled. As used herein, the term "and/or" or the expression "at least one of . . ." includes any and all combinations of one or more of the associated listed items.

Unless otherwise defined, all terms (including technical terms and scientific terms) used herein have the same meanings as generally understood by those skilled in the art to which the present disclosure belongs.

Figure 1:
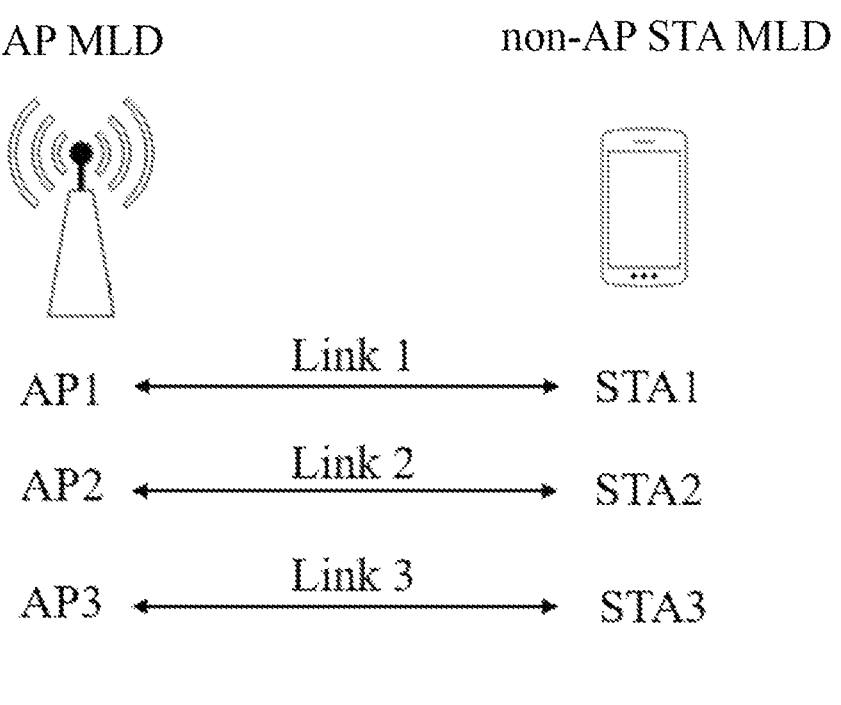
FIG. 1 is a schematic diagram showing a communication scenario under multi-link.

FIG. 1 is a schematic diagram showing a communication scenario under multi-link.

In a wireless local area network, a Basic Service Set (BSS) can consist of an AP and one or more Stations (STAs) that communicate with the AP. A BSS can be connected to a Distribution System (DS) through its AP, and then connected to another BSS, to form an Extended Service Set (ESS).

The AP is a wireless switch used for a wireless network and is also a core of the wireless network. The AP device can be used as a wireless base station and is mainly used as a bridge to connect the wireless network and a wired network. With this AP, the wired and wireless networks can be integrated.

The AP may include software applications and/or circuits to enable other types of nodes in the wireless network to communicate with outside and inside of the wireless network via the AP. In some examples, the AP can be a terminal device or a network device equipped with a Wireless Fidelity (Wi-Fi) chip by way of example.

For example, the STA may include, but is not limited to: a cellular phone, a smart phone, a wearable device, a computer, a Personal Digital Assistant (PDA), a Personal Communication System (PCS) device, a Personal Information Manager (PIM), a Personal Navigation Device (PND), a global positioning system, a multimedia device, an Internet of Things (IoT) device, and the like.

In examples of the present disclosure, the AP and the STA may be devices supporting a plurality of links, which may, for example, be denoted as an AP MLD and a non-AP STA MLD, respectively. For ease of description, an example in which one AP communicates with one STA under the plurality of links is mainly described in the following, but the examples of the present disclosure are not limited to this.

In the related art, in order to enable the station to quickly access a network, a Fast Initial Link Setup (FILS) mechanism can be used, and the FILS mechanism includes a pre-configuration mechanism for an IP address. This pre-configuration mechanism for the IP address in the FILS mechanism can only meet requirements under a single link.

In FIG. 1, as an example only, the AP MLD may represent an access point supporting a multi-link communication function, and the non-AP STA MLD may represent a station supporting the multi-link communication function. Referring to FIG. 1, the AP MLD can work under three links, such as AP1, AP2 and AP3 shown in FIG. 1, and the non-AP STA MLD can also work under three links, such as STA1, STA2 and STA3 shown in FIG. 1. In the example of FIG. 1, it is assumed that AP1 communicates with STA1 through a corresponding first link Link 1. Similarly, AP2 and AP3 communicate with STA2 and STA3 through a second link Link 2 and a third link Link 3, respectively. Moreover, Link 1 to Link 3 can be a plurality of links at different frequencies, for example, links at 2.4 GHz, 5 GHz, 6 GHz, etc., or several links with the same or different bandwidths at 2.4 GHz, 5 GHz, or 6 GHz. In addition, there may exist a plurality of channels under each link. However, it should be understood that the communication scenario shown in FIG. 1 is only illustrative, and the inventive concept is not limited thereto. For example, the AP MLD may be connected to a plurality of non-AP STA MLDs, or the AP MLD can communicate with a plurality of other types of stations under each link. For ease of description, the non-AP STA, the station and the station device can be used interchangeably in the following.

According to examples of the present disclosure, a FILS mechanism capable of assigning the IP address to the station under the plurality of links may be provided.

Figure 2:
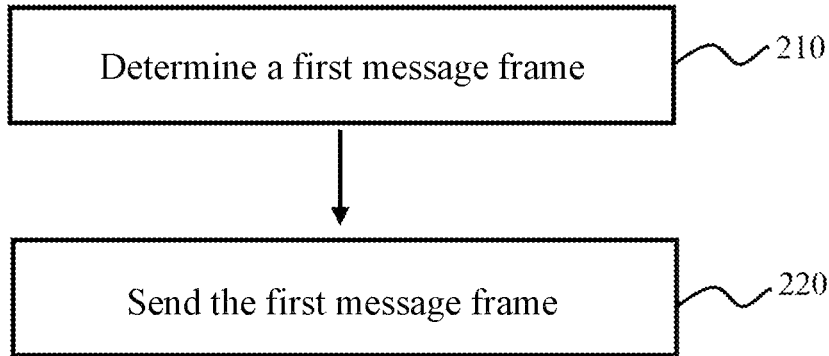
FIG. 2 is a flowchart showing a communication method according to an example of the present disclosure.

FIG. 2 is a flowchart showing a communication method according to an example. The communication method shown in FIG. 2 can be applied to a station device supporting a multi-link communication.

Referring to FIG. 2, in step 210, a first message frame may be determined. The first message frame includes information for indicating the station device to request a Fast Initial Link Setup (FILS) IP address configuration. In examples of the present disclosure, there may be many ways to determine the first message frame. For example, the station device supporting the multi-link communication may generate the first message frame according to at least one of the following conditions: a network condition, a load condition, a hardware capability of a transmission/reception device, a service type, and a related protocol provision, which is not specifically limited by the examples of the present disclosure. In examples of the present disclosure, the station device may also acquire the first message frame from an external device, which is not specifically limited by the examples of the present disclosure.

According to examples of the present disclosure, the information for indicating the station device to request the Fast Initial Link Setup (FILS) IP address configuration may include a FILS IP address assignment element for identifying type information of an IP address requested by the station device. As an example, the FILS IP address assignment element may be defined as shown in Table 1 to Table 3 below.

5

TABLE 1

| | | | FILS IP Address Assignment element | |
| --- | --- | --- | --- | --- |
| | Element ID | Length | Element ID Extension | IP Address Data |
| Octets: | 1 | 1 | 1 | variable |

In the Table 1, the IP address data (IP Address Data) field for request may be defined as shown in Table 2 below.

TABLE 2

| | IP Address Data field for request | | |
| --- | --- | --- | --- |
| | IP Address Request Control | Requested IPv4 Address (optional) | Requested IPv6 Address (optional) |
| Octets: | 1 | 0 or 4 | 0 or 16 |

In the Table 2, the IP address request control (IP Address Request Control) subfield may be defined as shown in Table 3 below.

TABLE 3

| | IP Address Request Control subfield | | | |
| --- | --- | --- | --- | --- |
| | IPv4 | IPv6 | DNS Server Address Request | Reserved |
| bits: | 2 | 2 | 1 | 3 |

In the Table 3, the IPv4 subfield can be set to different values to indicate that the station requests an IPv4 address. For example, the IPv4 subfield can be set to 0 to indicate that the station does not request the IPv4 address; the IPv4 subfield can be set to 1 (reserved); the IPv4 subfield can be set to 2 to indicate that the station requests a new IPv4 address; and the IPv4 subfield can be set to 3 to indicate that an IPv4 address in a form of element is requested. According to examples of the present disclosure, when the IPv4 subfield is set to request a specific IPv4 address, the Requested IPv4 Address (4 Octets) in the Table 2 may carry a type of the specific IPv4 address that the non-AP STA is requesting.

In the Table 3, the IPv6 subfield can be set to different values to indicate that the station requests an IPv6 address. For example, the IPv6 subfield can be set to 0 to indicate that the station does not request the IPv6 address; the IPv6 subfield can be set to 1 (reserved); the IPv6 subfield can be set to 2 to indicate that the station requests a new IPv6 address; and the IPv6 subfield can be set to 3 to indicate that an IPv6 address in a form of element is requested. According to examples of the present disclosure, when the IPv6 subfield is set to request a specific IPv6 address, the Requested IPv6 Address (16 Octets) in the Table 2 may carry a type of the specific IPv6 address that the non-AP STA is requesting.

In the Table 3, if the station requests one or more DNS server addresses, the DNS Server Address Request subfield can be set to 1. A type of the requested DNS server address may correspond to a type of the requested IP address. For example, if both IPv4 and IPv6 are requested, the DNS server address request can be set to 1 to request DNS server addresses for both types.

It will be understood that set values of respective subfields described above with respect to the Table 3 are only illustrative, rather than limiting examples of the present disclosure, and other values that can identify the type of the IP address requested by the station device are also included within the scope of the present disclosure.

In addition, it can be understood that each element shown in the Table 1 to Table 3 exists independently, and these elements are illustratively listed in the same table, which, however, does not mean that all elements in the table must exist simultaneously as shown in the table. A value of each element is not dependent on a value of any other element in the Table 1 to Table 3. Therefore, those skilled in the art can understand that the value of each element in the tables of the present disclosure is an independent example.

According to examples of the present disclosure, the information (e.g., the FILS IP address assignment element) for indicating the station device to request the Fast Initial Link Setup (FILS) IP address configuration may be a MLD-level element for indicating the access point device to assign one IP address to the plurality of links of the station device. That is to say, in a case where the FILS IP address assignment element is the MLD-level element, the plurality of links of the station device can share one IP address. In an example, in the case of the MLD-level element, a single FILS IP address assignment element may be packaged in the first message frame. For example, the FILS IP address assignment element is packaged in an association request frame or a re-association request frame in the form of independent element. In another example, in the case of the MLD-level element, the FILS IP address assignment element may be packaged in a ML probe request frame. The ML probe request frame may include a ML element as shown in Table 4 below.

TABLE 4

| | Multi-Link (ML) Element | | | | | |
| --- | --- | --- | --- | --- | --- | --- |
| | Element ID | Length | Element ID Extension | Multi-Link Control | Common Info | Link Info |
| Octets: | 1 | 1 | 1 | 2 | variable | variable |

Referring to the Table 4, in the case of the MLD-level element, the FILS IP address assignment element may be packaged in the common information (Common Info) subfield of the ML probe request frame. That is to say, the FILS IP address assignment element does not exist in the first message frame (e.g., the ML probe request frame) in the form of separate element, but is embedded in another element (the ML element).

According to examples of the present disclosure, the information for indicating the station device to request the Fast Initial Link Setup (FILS) IP address configuration may be a link-level element for indicating the access point device to assign corresponding IP addresses to the plurality of links of the station device, respectively. That is to say, each of the plurality of links of the station device may have its IP address. Types of IP addresses corresponding to respective links of the plurality of links may be the same or different.

In this case, the information for indicating the station device to request the Fast Initial Link Setup (FILS) IP address configuration may further include a link identification corresponding to each of the plurality of links of the station device, and the FILS IP address assignment element corresponds to the link identification of each link. That is to say, the IP address request of each link can be identified by using the "FILS IP address assignment element+link identification".

In an example of the present disclosure, in the case of the link-level element, the "FILS IP address assignment element+link identification" may be packaged in the "Link Info" subfield shown in the Table 4.

In addition, it can be understood that each element shown in the Table 4 exists independently, and these elements are illustratively listed in the same table, which, however, does not mean that all elements in the table must exist simultaneously as shown in the table. A value of each element is not dependent on a value of any other element in the Table 4. Therefore, those skilled in the art can understand that the value of each element in the table of the present disclosure is an independent example.

With continued reference to FIG. 2, in step 22, the first message frame may be sent. For example, the station device may send the first message frame carrying the information described with reference to the Table 1 to Table 4 to the access point device under any of the plurality of links, so as to request the IP address from the access point device.

It can be understood that the steps included in the communication method shown in FIG. 2 are only illustrative, and examples of the present disclosure are not limited thereto. For example, the communication method shown in FIG. 2 may further include: sending a second message frame including information that the station device supports the FILS IP address configuration. For example, the second message frame may carry an identification bit indicating that the station device supports the FILS IP address configuration. That is to say, the second message frame may carry the identification bit that the device supports a FILS function. According to examples, the second message frame may be the probe request frame or the multi-link probe request frame. As an example, the second message frame may be sent before the first message frame.

The communication method shown in FIG. 2 can assign the IP address to the station under the plurality of links, improving the spectrum utilization.

Figure 3:
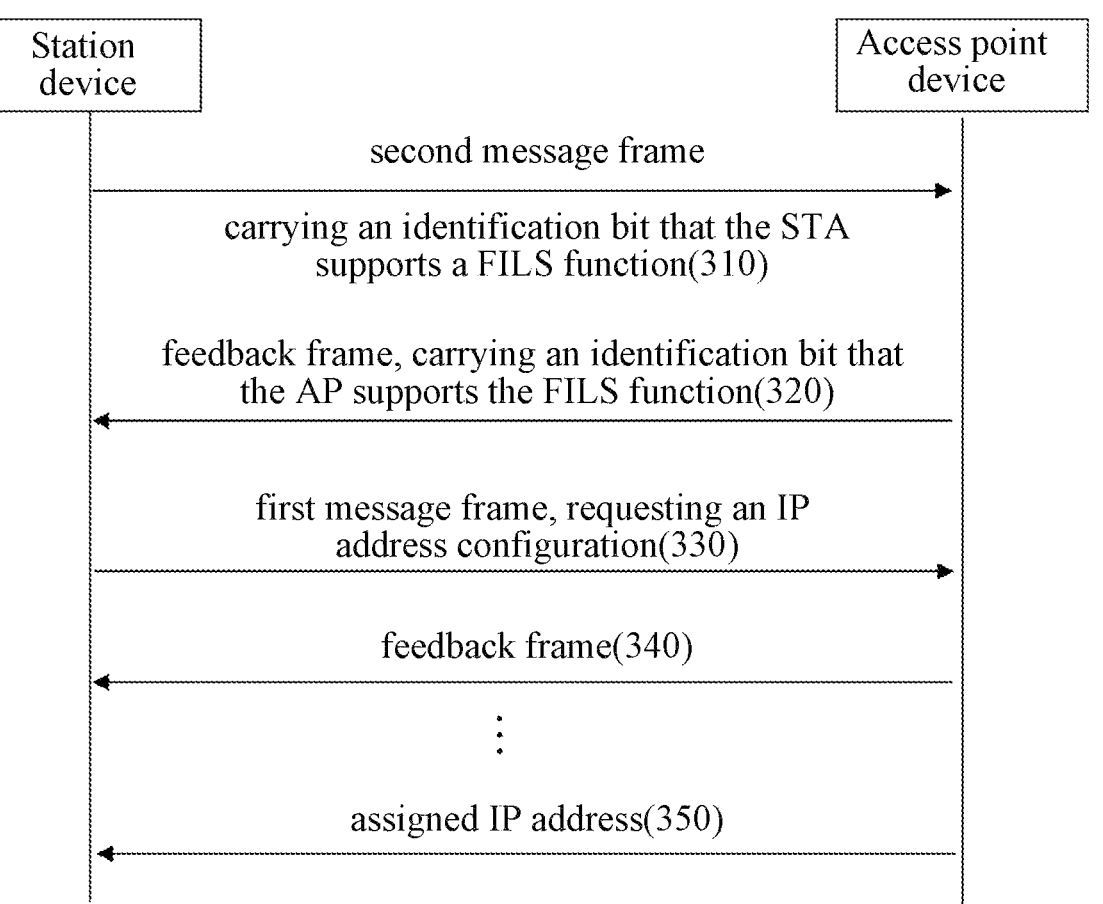
FIG. 3 is a schematic diagram showing a station device requesting a FILS IP address configuration from an access point device according to an example of the present disclosure.

FIG. 3 is a schematic diagram showing a station device requesting a FILS IP address configuration from an access point device according to an example.

Referring to FIG. 3, in operation 310, the station device may send a second message frame to the access point device, and carry information that the station device supports a FILS IP address configuration in the second message frame. For example, the second message frame may be the probe request frame or the multi-link probe request frame.

In operation 320, the station device may receive a feedback frame, such as a probe response frame or a multi-link probe response frame, from the access point device. In some examples of the present disclosure, information that the access point device supports the FILS IP address configuration may be carried in the feedback frame (e.g., the probe response frame or the multi-link probe response frame).

In operation 330, the station device may send a first message frame to the access point device, and carry information for indicating the station device to request a Fast Initial Link Setup (FILS) IP address configuration in the first message frame. For example, the first message frame may be an association request frame or a re-association request frame. The operation 330 may be similar to the communication method in FIG. 2.

In operation 340, the station device may receive the feedback frame, such as an association response frame or a re-association response frame, from the access point device, so that the station device may establish an association link with the access point device.

Subsequently, the station device can perform other communication operations, such as a key-based authentication operation, with the access point device.

In operation 350, the station device may receive an assigned IP address from the access point device.

It will be understood that the interactive communication between the station device and the access point device shown in FIG. 3 is only illustrative, rather than limiting examples of the present disclosure. In examples, some operations shown in FIG. 3 may be omitted or combined, for example, the operation 310 and the operation 320 may be omitted, or the identification bit that the access point device supports the FILS function may not be carried in the feedback frame (e.g., the probe response frame or the multi-link probe response frame) in the operation 320, but carried in the feedback frame (e.g., the association response frame or the re-association response frame) in the operation 340. In examples, the interactive communication shown in FIG. 3 may further include an authentication operation, or an interactive operation between the access point device and an upper layer.

The communication method shown in FIG. 3 can interact information about FILS during establishing the association link between the station device and the access point device, and then can perform the FILS IP address assignment (for example, after the authentication operation), which can save the signaling, and improve the wireless communication efficiency.

Figure 4:
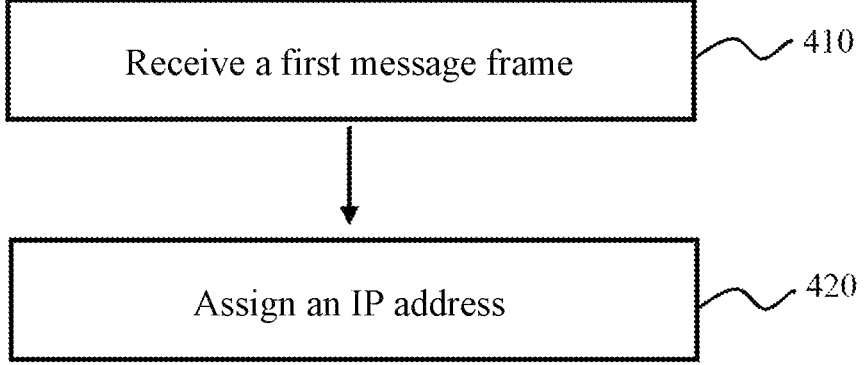
FIG. 4 is a flowchart showing another communication method according to an example of the present disclosure.

FIG. 4 is a flowchart showing another communication method according to examples of the present disclosure. The communication method shown in FIG. 4 can be applied to an access point device supporting a multi-link communication.

Referring to FIG. 4, in step 410, the access point device may receive a first message frame from a station device, and the first message frame may include information for indicating the station device supporting the multi-link communication to request a Fast Initial Link Setup (FILS) IP address configuration.

According to examples, the information may include a FILS IP address assignment element for identifying type information of an IP address requested by the station device. The FILS IP address assignment element may be similar to the above description with reference to the Table 1 to Table 3, and for the sake of brevity, a repeated description is omitted here.

According to examples, the information is a MLD-level element for indicating the access point device to assign one IP address to a plurality of links of the station device.

According to examples, the information is a link-level element for indicating the access point device to assign corresponding IP addresses to the plurality of links of the station device, respectively. In this case, the information may further include a link identification corresponding to each of the plurality of links of the station device, and the FILS IP address assignment element corresponds to the link identification of each link.

According to examples, the first message frame may be an association request frame, a re-association request frame or a multi-link probe request frame.

According to examples, in a case where the information is the MLD-level element, the FILS IP address assignment element may be included in the association request frame or the re-association request frame.

According to examples, the multi-link probe request frame includes the multi-link element shown in the Table 4, and the information for indicating the station device supporting the multi-link communication to request the Fast Initial Link Setup (FILS) IP address configuration may be included in the multi-link element.

According to examples, in the case where the information is the MLD-level element, the FILS IP address assignment element is included in a common information subfield of the multi-link element.

According to examples, in a case where the information is the link-level element, the FILS IP address assignment element and the corresponding link identification may be included in a link information subfield of the multi-link element.

In step 420, the access point device may assign an IP address to the station device based on the first message frame. For example, if the information in the first message frame indicates the MLD-level element, the access point device can assign one shared IP address to the plurality of links of the station device. If the information in the first message frame indicates the link-level element, the access point device can assign the corresponding IP addresses to the plurality of links of the station device, respectively. Respective IP addresses assigned to the plurality of links may have the same or different types.

According to an example of the present disclosure, the step 420 may include: in response to the station device having an Enhanced Multi-Link Multi-Radio (EMLMR) function, the access point device assigns the corresponding IP addresses to the plurality of links of the station device, respectively. In this example, the access point device may obtain whether the station device has the EMLMR function from capability information sent by the station device.

According to an example of the present disclosure, the step 420 may include: in response to the station device having an Enhanced Multi-Link Single-Radio (EMLSR) function, the access point device assigns one IP address to the plurality of links of the station device. In this example, the access point device may obtain whether the station device has the EMLSR function from the capability information sent by the station device.

It can be understood that the steps included in the communication method shown in FIG. 4 are only illustrative, and examples of the present disclosure are not limited thereto. For example, the communication method shown in FIG. 4 may further include: sending a third message frame, and the third message frame may include information indicating that the access point device supports the requested FILS IP address configuration. That is to say, the third message frame may include an identification bit that the access point device supports the FILS function. According to examples, the third message frame may be an association response frame, a re-association response frame or a multi-link probe response frame. As an example, the third message frame may be sent before the step 420 is performed.

The communication method shown in FIG. 4 can assign the IP address to the station under the plurality of links, improving the spectrum utilization.

Figure 5:
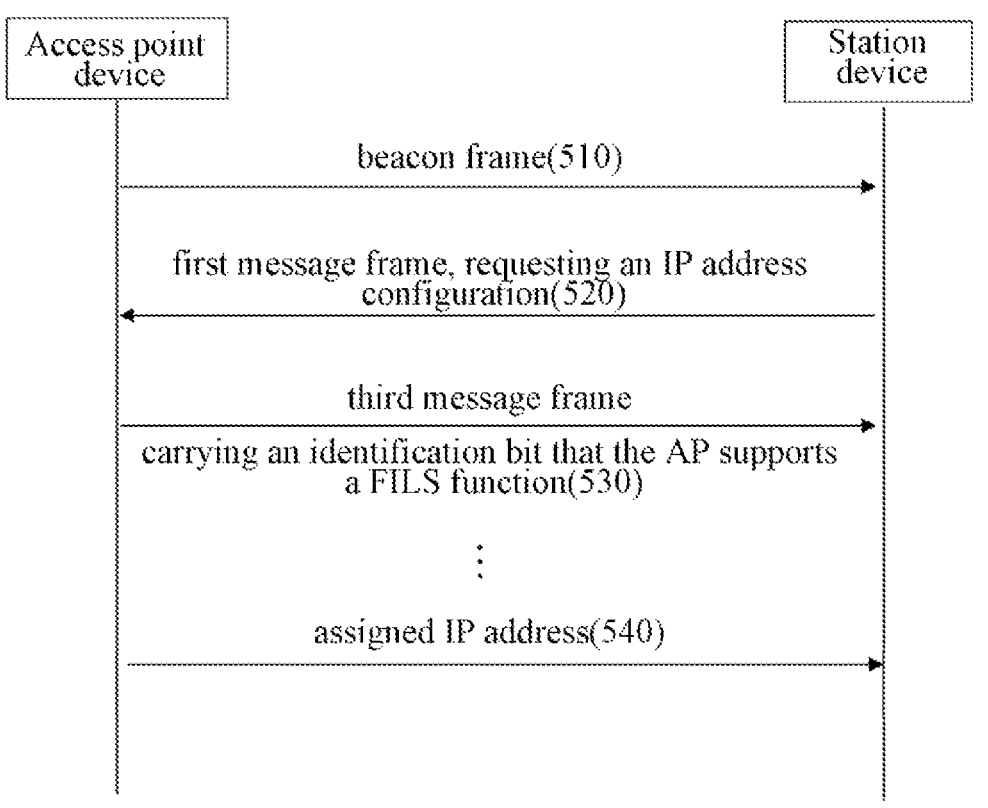
FIG. 5 is a schematic diagram showing an interactive communication between an access point device and a station device according to an example of the present disclosure.

FIG. 5 is a schematic diagram showing an interactive communication between an access point device and a station device according to an example.

Referring to FIG. 5, in operation 510, the access point device may broadcast a beacon frame, and the station device may receive the broadcasted beacon frame.

In operation 520, the access point device may receive a first message frame (e.g., an association request frame or a re-association request frame) from the station device, and the first message frame may include information for indicating the station device supporting a multi-link communication to request a Fast Initial Link Setup (FILS) IP address configuration. The operation 520 may be similar to the step 410 shown in FIG. 4, and for the sake of brevity, a repeated description is omitted here.

In operation 530, the access point device may send a third message frame to the station device, and the third message frame may include information indicating that the access point device supports the requested FILS IP address configuration. That is to say, the third message frame may carry an identification bit indicating that the access point device supports the FILS function.

Subsequently, the access point device may perform other communication operations (e.g., a key-based authentication operation) with the station device, or the access point device may perform a communication operation with an upper layer.

In operation 540, the access point device may send an assigned IP address to the station device. The operation 540 may be similar to the step 420 in FIG. 4, and for the sake of brevity, a repeated description is omitted here.

It will be understood that the operation of the interactive communication between the access point device and the station device shown in FIG. 5 is only illustrative, rather than limiting examples of the present disclosure. In examples, some operations shown in FIG. 5 may be omitted or combined, or more other operations may also be included.

The communication method shown in FIG. 5 can interact information about FILS during establishing the association link between the station device and the access point device, and then can perform the FILS IP address assignment (for example, after the authentication operation), which can save the signaling, and improve the wireless communication efficiency.

In examples of the present disclosure, the station may carry the FILS IP address assignment element in the ML probe request frame, the association request frame or the re-association request frame. For example, the FILS IP address assignment element can be packaged in the association request frame or the re-association request frame, identifying that the FILS IP address assignment element is the MLD-level element, that is, the AP can assign the same type of IP address under each link. For another example, the FILS IP address assignment element is packaged in the ML element, and appears as the MLD-level element or the link-level element. As described with reference to the Table 4, when appearing in the form of MLD-level element, the FILS IP address assignment element can be packaged in the common information subfield; and when the FILS IP address assignment element appears in the form of link-level element, the AP can assign a different IP address to each link, and the "link identification (ID)+FILS IP address assignment element" can be packaged in the link information subfield.

In examples of the present disclosure, EMLMR and EMLSR functions of the station may be considered. According to a capability information value of the station, the AP can assign the IP address to the station under each link if the station is an EMLMR station, and if the station is an EMLSR station, the AP can only assign one IP address to the station due to the EMLSR station only being capable of performing a single-link communication at a certain point of time, and the assigned IP address in this way can be reused under each link.

Figure 6:
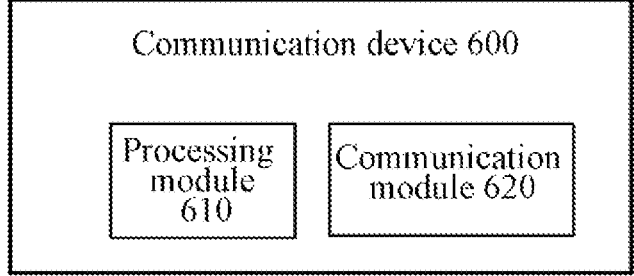
FIG. 6 is a block diagram showing a communication device according to an example of the present disclosure.

FIG. 6 is a block diagram showing a communication device according to an example. The communication device 600 may include a processing module 610 and a communication module 620.

In an example, the communication device 600 may be applied to a station device supporting a multi-link communication. In this case, the processing module 610 may be configured to determine a first message frame, and the first message frame may include information for indicating the station device to request a Fast Initial Link Setup (FILS) IP address configuration; and the communication module 620 may be configured to send the first message frame.

In a case where the communication device 600 is applied to the station device supporting the multi-link communication, the communication device 600 can perform the communication method described with reference to FIG. 2 and operations in FIGS. 3 and 5 performed by the station device, and for the sake of brevity, a repeated description is omitted here.

In another example, the communication device 600 may be applied to an access point device supporting the multi-link communication. In this case, the communication module 620 may be configured to receive a first message frame, and the first message frame may include information for indicating a station device to request a Fast Initial Link Setup (FILS) IP address configuration; and the processing module 610 may be configured to assign an IP address to the station device based on the first message frame.

In a case where the communication device 600 is applied to the access point device supporting the multi-link communication, the communication device 600 can perform the communication method described with reference to FIG. 4 and operations in FIGS. 3 and 5 performed by the access point device, and for the sake of brevity, a repeated description is omitted here.

The communication device 600 according to examples of the present disclosure can assign the IP address to the station under a plurality of links, improving the spectrum utilization, saving the signaling, and improving the wireless communication efficiency.

In addition, the communication device 600 shown in FIG. 6 is only illustrative, and examples of the present disclosure are not limited thereto. For example, the communication device 600 may further include other modules, such as a memory module. In addition, various modules in the communication device 600 may be combined into more complex modules, or may be divided into more separate modules.

Based on the same principle as the method provided by examples of the present disclosure, the examples of the present disclosure further provide an electronic device, which includes a processor and a memory. Machine-readable instructions (which may also be referred to as a "computer program") are stored in the memory; and the processor is configured to perform the machine-readable instructions to implement the methods described with reference to FIGS. 2-5.

Examples of the present disclosure further provide a computer-readable storage medium having a computer program stored thereon, which, when executed by a processor, implements the methods described with reference to FIGS. 2 to 5.

In examples, the processor may be configured to implement or execute various illustrative logical blocks, modules and circuits described in connection with the disclosure, for example, a Central Processing Unit (CPU), a general-purpose processor, a Digital Signal Processor (DSP), an Application Specific Integrated Circuit (ASIC), a Field Programmable Gate Array (FPGA), or other programmable logic devices, transistor logic devices, hardware components, or any combination thereof. The processor may also be a combination that implements computing functions, including, for example, a combination of one or more microprocessors, a combination of the DSP and a microprocessor, and the like.

In examples, the memory may be, for example, a Read Only Memory (ROM), a Random Access Memory (RAM), an Electrically Erasable Programmable Read Only Memory (EEPROM), a Compact Disc Read Only Memory (CD-ROM) or other CD storage, an optical disk storage (including a compressed disk, a laser disk, an optical disk, a digital universal disk, a Blu-ray disk, etc.), a magnetic disc storage medium or other magnetic storage devices, or any other medium that can be used to carry or store program codes in the form of instructions or data structures and that can be accessed by a computer, but the memory is not limited to this.

It is to be understood that although respective steps in the flowcharts of the drawings are displayed in sequence according to the indication of arrows, these steps are not necessarily performed in the sequence indicated by the arrows. Unless otherwise explicitly specified in the present disclosure, execution of these steps is not strictly limited by the sequence, and the steps may be performed in other sequences. In addition, at least part of the steps in the flowcharts of the drawings may include a plurality of sub-steps or a plurality of stages. These sub-steps or stages are not necessarily completed at the same moment, but may be performed at different moments. Besides, these sub-steps or stages may not be necessarily performed sequentially, but may be performed in turn or alternately with other steps or at least part of sub-steps or stages of other steps.

Although the present disclosure has been shown and described with reference to certain examples of the present disclosure, it will be understood by those skilled in the art that various changes in forms and details may be made without departing from the scope of the present disclosure. Therefore, the scope of the present disclosure should not be limited by the examples, but should be defined by the appended claims and their equivalents.

What is claimed is:

1. A communication method, applied to a station device supporting a multi-link communication, comprising:
   determining, at the station device, a first message frame, wherein the first message frame comprises information that indicates to the station device to request a Fast Initial Link Setup (FILS) Internet Protocol (IP) address configuration; and
   sending, via the station device, the first message frame, wherein the information comprises a FILS IP address assignment element for identifying type information of an IP address requested by the station device.

2. The communication method according to claim 1, wherein the information is a Multi-Link Device (MLD)-level element for indicating an access point device to assign one IP address to a plurality of links of the station device.

3. The communication method according to claim 1, wherein the information is a link-level element for indicating an access point device to assign corresponding IP addresses to a plurality of links of the station device, respectively.

4. The communication method according to claim 3, wherein the information further comprises a link identification corresponding to each link of the plurality of links; and wherein the FILS IP address assignment element corresponds to the link identification of each link.

5. The communication method according to claim 1, wherein the first message frame is an association request frame, a re-association request frame or a multi-link probe request frame.

6. The communication method according to claim 5, wherein in a case where the information is a Multi-Link Device (MLD)-level element, the FILS IP address assignment element is comprised in the association request frame or the re-association request frame.

7. The communication method according to claim 5, wherein the multi-link probe request frame comprises a multi-link element, and wherein the information is comprised in the multi-link element.

8. The communication method according to claim 7, wherein the multi-link element comprises a common information subfield, and wherein in a case where the information is a Multi-Link Device (MLD)-level element, the information is comprised in the common information subfield.

9. The communication method according to claim 7, wherein the multi-link element comprises a link information subfield; and wherein in a case where the information is a link-level element, the information is comprised in the link information subfield.

10. The communication method according to claim 1, wherein the communication method further comprises:

sending a second message frame, wherein the second message frame comprises information that the station device supports the FILS IP address configuration.

11. The communication method according to claim 10, wherein the second message frame is a probe request frame or a multi-link probe request frame.

12. A communication method, applied to an access point device supporting a multi-link communication, comprising:

receiving, at the access point device, a first message frame, wherein the first message frame comprises information that indicates to a station device, supporting the multi-link communication, to request a Fast Initial Link Setup (FILS) Internet Protocol (IP) address configuration; and assigning, via a FILS mechanism, an IP address to the station device based on the first message frame, wherein the information comprises a FILS IP address assignment element for identifying type information of an IP address requested by the station device.

13. The communication method according to claim 12, wherein the information is a Multi-Link Device (MLD)-level element for indicating the access point device to assign one IP address to a plurality of links of the station device.

14. The communication method according to claim 12, wherein the information is a link-level element for indicating the access point device to assign corresponding IP addresses to a plurality of links of the station device, respectively.

15. The communication method according to claim 14, wherein the information further comprises a link identification corresponding to each link of the plurality of links; and wherein the FILS IP address assignment element corresponds to the link identification of each link.

16. The communication method according to claim 12, wherein the first message frame is an association request frame, a re-association request frame or a multi-link probe request frame.

17. The communication method according to claim 16, wherein in a case where the information is a Multi-Link Device (MLD)-level element, the FILS IP address assignment element is comprised in the association request frame or the re-association request frame.

18. The communication method according to claim 16, wherein the multi-link probe request frame comprises a multi-link element, and wherein the information is comprised in the multi-link element.

* * * * *